(12) United States Patent
Wright

(10) Patent No.: US 7,203,171 B1
(45) Date of Patent: Apr. 10, 2007

(54) INGRESS DISCARD IN OUTPUT BUFFERED SWITCHING DEVICES

(75) Inventor: Ian M. Wright, Woodside, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/468,246

(22) Filed: Dec. 20, 1999

(51) Int. Cl.
*H04J 3/14* (2006.01)

(52) U.S. Cl. .................. 370/236.1; 370/229; 370/416

(58) Field of Classification Search ............. 370/229, 370/230, 231, 235, 236, 236.1, 236.2, 237, 370/241.1, 395.7, 395.71, 395.72, 412–420, 370/421–429

See application file for complete search history.

(56) References Cited

U.S. PATENT DOCUMENTS

| | | | | |
|---|---|---|---|---|
| 5,088,032 A | | 2/1992 | Bosack ....................... 395/200 |
| 5,313,454 A | * | 5/1994 | Bustini et al. ............... 370/231 |
| 5,436,891 A | * | 7/1995 | Grossman et al. .......... 370/231 |
| 5,509,006 A | | 4/1996 | Wilford et al. ............... 370/60 |
| 5,570,360 A | * | 10/1996 | Klausmeier et al. ........ 370/232 |
| 5,650,993 A | * | 7/1997 | Lakshman et al. .......... 370/236 |
| 5,689,505 A | | 11/1997 | Chiussi et al. .............. 370/388 |
| 5,768,257 A | * | 6/1998 | Khacherian et al. ........ 370/229 |
| 5,838,994 A | | 11/1998 | Valizadeh ................... 395/876 |
| 5,852,655 A | | 12/1998 | McHale et al. ........... 379/93.14 |
| 5,872,783 A | | 2/1999 | Chin ........................... 370/392 |
| 5,926,458 A | * | 7/1999 | Yin ............................. 370/230 |
| 6,067,298 A | * | 5/2000 | Shinohara ................... 370/236 |
| 6,122,252 A | * | 9/2000 | Aimoto et al. .............. 370/235 |
| 6,247,058 B1 | * | 6/2001 | Miller et al. ................ 709/234 |
| 6,442,172 B1 | * | 8/2002 | Wallner et al. ............. 370/416 |
| 6,452,905 B1 | * | 9/2002 | Smith et al. ............. 370/236.1 |
| 6,490,251 B2 | * | 12/2002 | Yin et al. ................ 370/236.1 |

* cited by examiner

*Primary Examiner*—Chi Pham
*Assistant Examiner*—Phuc Tran
(74) *Attorney, Agent, or Firm*—Campbell Stephenson Ascolese, LLP

(57) ABSTRACT

Disclosed herein is a packet switching device coupled to receive inbound packets from a network, switch the packets through a switching fabric, and provide outbound packets to a network. Multiple different packet switching devices use such switching fabric to exchange inbound packets. The packet switching device includes an output traffic manager that selectively stores outbound packets from the switching fabric in queues until the packets can be transmitted to the network. When any queue is unable to store more outbound packets, the output traffic manager communicates to the input traffic manager to drop inbound packets destined for that queue, instead of transferring them to the switching fabric and ultimately dropping the packets as outbound packets. Thereby traffic through the switching fabric is reduced.

38 Claims, 4 Drawing Sheets

INGRESS DISCARD IN OUTPUT BUFFERED SWITCHING DEVICES

BACKGROUND

1. Field of the Invention

The present invention is directed to internetworking systems and in particular to methods and apparatuses for managing traffic flow in routers and switches.

2. Description of Related Art

Internetworking encompasses all facets of communications between and among communication networks. Such communications may include voice, video, still images, and data traffic. All communications have widely varying needs in terms of propagation delay (or latency) during transit through the network. Various systems and devices, both in hardware and in software, have attempted to deal with the plethora of data flow requirements present in modern internetworking systems.

In a communications network, routing devices receive communications at one of a set of input interfaces and forward them to one of a set of output interfaces. For a publication describing routing devices, see Chapter 7 of "Interconnection Networks: An Engineering Approach" by Jose Duato, Sudhakar Yalamanchili and Lionel Ni, published by IEEE Computer Society Press, Los Alamitos, Calif., 1997, which is incorporated by reference herein in its entirety.

Users typically require that such routing devices receive and forward communications as quickly as possible. In a packet routing network, where communications are transmitted in discrete portions or "packets" of data, each packet includes a header. The header contains information used for routing the packet to an output interface and subsequent forwarding to a destination device. The packet may also be forwarded to another router for further processing and/or forwarding. Header information used for routing may include the destination address and source address for the packet. Additionally, header information such as the destination device port, source device port, protocol, packet length, and packet priority may be used. Header information used by routing devices for administrative tasks may include information about access control, accounting, quality of service (QoS), or class of service (CoS). Herein, a "packet" is any grouping of one or more data elements of any size, including data cells and data bytes, and encoded using any protocol.

FIG. 1 depicts a generic packet routing/switching system 100 that will be used to describe both the prior art and embodiments of the invention. A well-known routing device or switch 100 includes: multiple linecards 110-0 to 110-X coupled to a switch fabric 120, which provides communications between one or multiple linecards 110. Herein "linecard 110" refers to any of linecards 110-0 to 110-X unless otherwise specified. Each linecard 110 includes an input interface 111, an output interface 112, a fabric interface 170, and a control element 130. Each linecard 110 connects to communications network 50, which may be any form of local, enterprise, metropolitan, or wide area network known in the art, through both input interface 111 and output interface 112.

A "port" can correspond to a fraction of the total bandwidth of input interface 111 or output interface 112. Alternatively, a "port" can correspond to the total bandwidth of input interface 111 or output interface 112.

Control element 130 is configured to receive inbound packets 113 (i.e., packets entering the system from network 50) from input interface 111, process each packet, and transmit it through fabric interface 170 to switching fabric 120 through which it is sent to another (or the same) linecard 110 for further processing. Control element 130 includes ingress receiver 140, input traffic manager 150, output traffic manager 160, and egress transmitter 180.

The ingress receiver 140 operates in conjunction with lookup circuit 145 (both of control element 130) to determine routing treatments for inbound packets 113. Lookup circuit 145 includes routing treatment information disposed in a memory data structure. Access and use of this information in response to data in the header of inbound packet 113 is accomplished with means well-known in the router art. These routing treatments can include one or more of the following:

- selection of one or more output interfaces (e.g., particular line card 110 and port to the network 50) to forward inbound packets 113 based on either a destination device field, source and destination device fields, or information in any other packet header fields;
- determination of whether to drop (i.e., not forward) inbound packets 113;
- determination of access control list (ACL) treatment for inbound packets 113:
- determination of class of service (CoS) treatment for inbound packets 113;
- determination of virtual private network (VPN) treatment for inbound packets 113;
- determination of one or more accounting records or treatments for inbound packets 113; and/or
- determination of other administrative treatment for inbound packets 113.

Examples of such routing systems may be found in U.S. Pat. No. 5,088,032, entitled "Method and Apparatus for Routing Communications Among Computer Networks" to Leonard Bosack; U.S. Pat. No. 5,509,006, entitled "Apparatus and Method for Switching Packets Using Tree Memory" to Bruce Wilford et al.; U.S. Pat. No. 5,852,655, entitled "Communication Server Apparatus Having Distributed Switching and Method" to John McHale et al.; and U.S. Pat. No. 5,872,783, entitled "Arrangement for Rendering Forwarding Decisions for Packets Transferred Among Network Switches" to Hon Wah Chin, all incorporated herein by reference in their entireties.

The input traffic manager 150 receives inbound packets 113 from the ingress receiver 140 and provides inbound packets 113 to the switching fabric 120. Input traffic manager 150 selectively buffers inbound packets 113 when the switching fabric 120 is too congested with packets that it cannot receive inbound packets 113. For examples of input traffic manager 150 and output traffic manager 160, see U.S. Pat. No. 5,926,458, entitled "Method and Apparatus for Servicing Multiple Queues," to Yin, U.S. Pat. No. 5,838,994, entitled "Method and Apparatus for the Dynamic Allocation of Buffers in a Digital Communications Network" to Valizadeh, and U.S. Pat. No. 5,689,505, entitled "Buffering of Multicast Cells in Switching Networks" to Chiussi, et al., which are all incorporated herein by reference in their entireties.

Output traffic manager 160 is similar to input traffic manager 150 except output traffic manager 160 receives outbound packets 114 from the switching fabric 120, via the fabric interface 170, and selectively buffers outbound packets 114 when the network 50 is so congested that it cannot receive outbound packets 114 (so called "output buffering scheme").

Conventional egress transmitter 180 manages transmission of outbound packets 114 from the output traffic manager 160 to network 50.

One problem with switching fabric 120 occurs when packets from multiple input ports to switching fabric 120 are addressed to the same output port of the switching fabric 120 (so called "contention"). Consequently, packets from some input ports are delayed access to the output port.

One solution to contention is called "speed up." For example, when packets from N input ports to switching fabric 120 are destined for the same output port of switching fabric 120, a speed up of X times the nominal packet speed through all transmission lines between input and output ports of the switching fabric 120 is used. Thereby, X packets now traverse the switching fabric 120 in the same time that 1 packet traversed the switching fabric 120 prior to speed up. However, "speed up" is not economical for very high line speeds.

Where packets are directed to specified output ports, certain ports may become overloaded with traffic beyond the speed up of the fabric, resulting in other ports which share fabric resources being "starved" from receiving data. For high line speeds, increasing the speed up would not be an economical solution.

Thus what is needed is a method and apparatus to reduce contention of packets input to a switching fabric and a network.

SUMMARY

One embodiment of the present invention includes an apparatus for switching packets from a network. The switching apparatus includes an ingress receiver that receives packets from the network ("inbound packets") and provides a designation (e.g., output port, class of service, etc.) for each inbound packet. In another embodiment, the receiver does not provide the designation. The designation is typically placed in the header of a packet.

A switch fabric is coupled to receive inbound packets from the ingress receiver and transmits each inbound packet based on an associated designation. An output traffic manager is coupled to receive packets from the switch fabric ("outbound packets"). In this embodiment, the output traffic manager includes at least one queue. The output traffic manager selectively stores outbound packets into a selected queue and selectively drops outbound packets when the selected queue is full. A particular queue may be designated based on any number of criteria, such as class of service, quality of service, customer, etc.

Approximately when or prior to when the output traffic manager drops outbound packets, the output traffic manager communicates to the ingress receiver to drop inbound packets destined for that queue.

The present invention reduces packet traffic through a switching fabric by receiving packets from a network ("inbound packets"); transmitting each packet to the switching fabric based on a specified designation; selectively queuing packets from the switching fabric; detecting imminent or active dropping of packets ("dropped packets") destined for a particular queue; signaling to drop inbound packets destined for the overloaded output queue; and dropping inbound packets.

One advantage of these embodiments is that the volume of inbound packets to the switching fabric is reduced when an output queue is overloaded, allowing the fabric to transmit more packets to the non-full queues.

Various embodiments of the present invention will be more fully understood in light of the following detailed description taken together with the accompanying drawings.

BRIEF DESCRIPTION OF THE DRAWINGS

In FIGS. 1 to 5, arrow-terminated lines represent single or multiple bit paths for packets or communications.

Note that use of the same reference numbers in different figures indicates the same or like elements.

DETAILED DESCRIPTION

Figure 1:
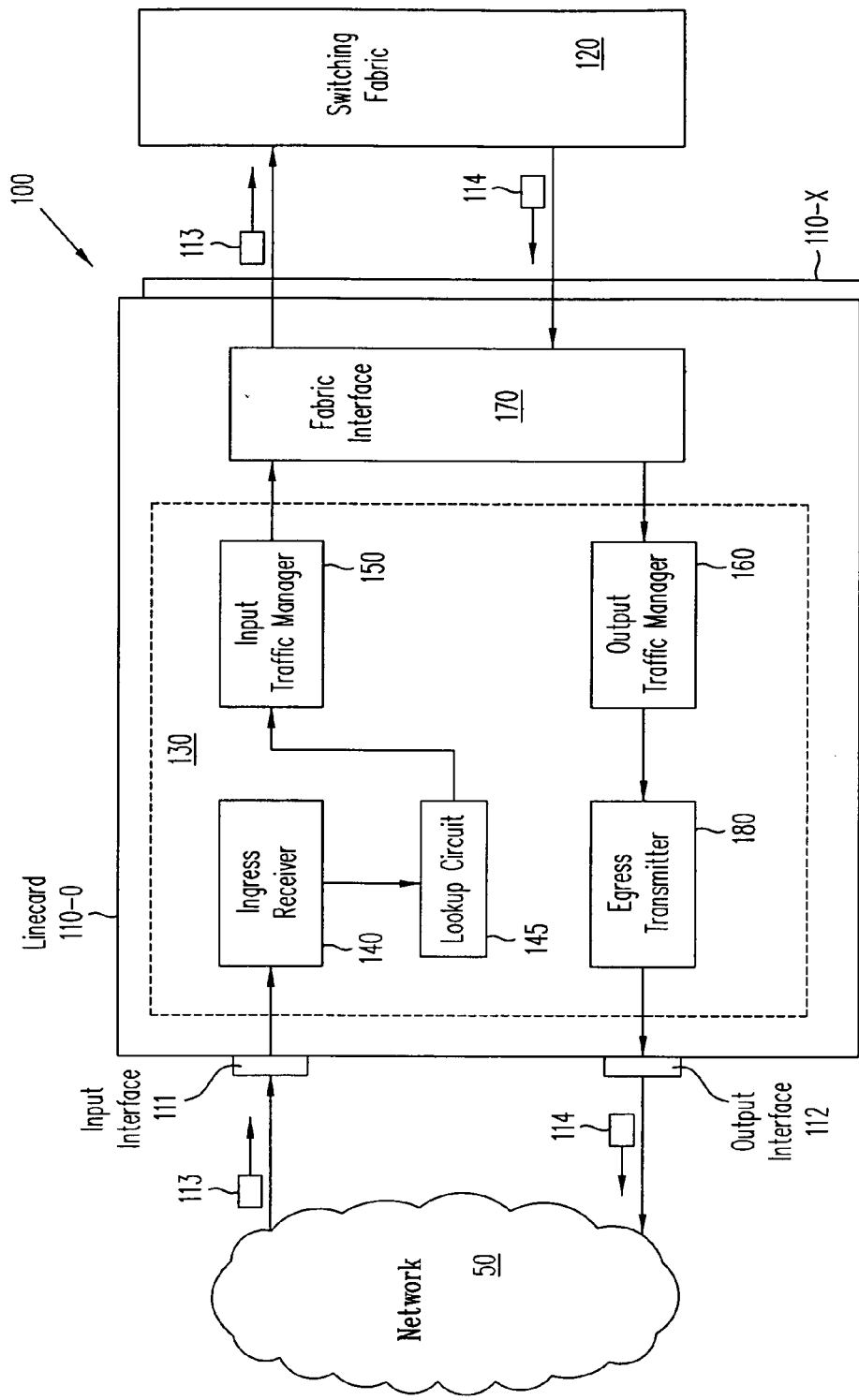
FIG. 1 depicts a generic packet routing/switching system.
Figure 2:
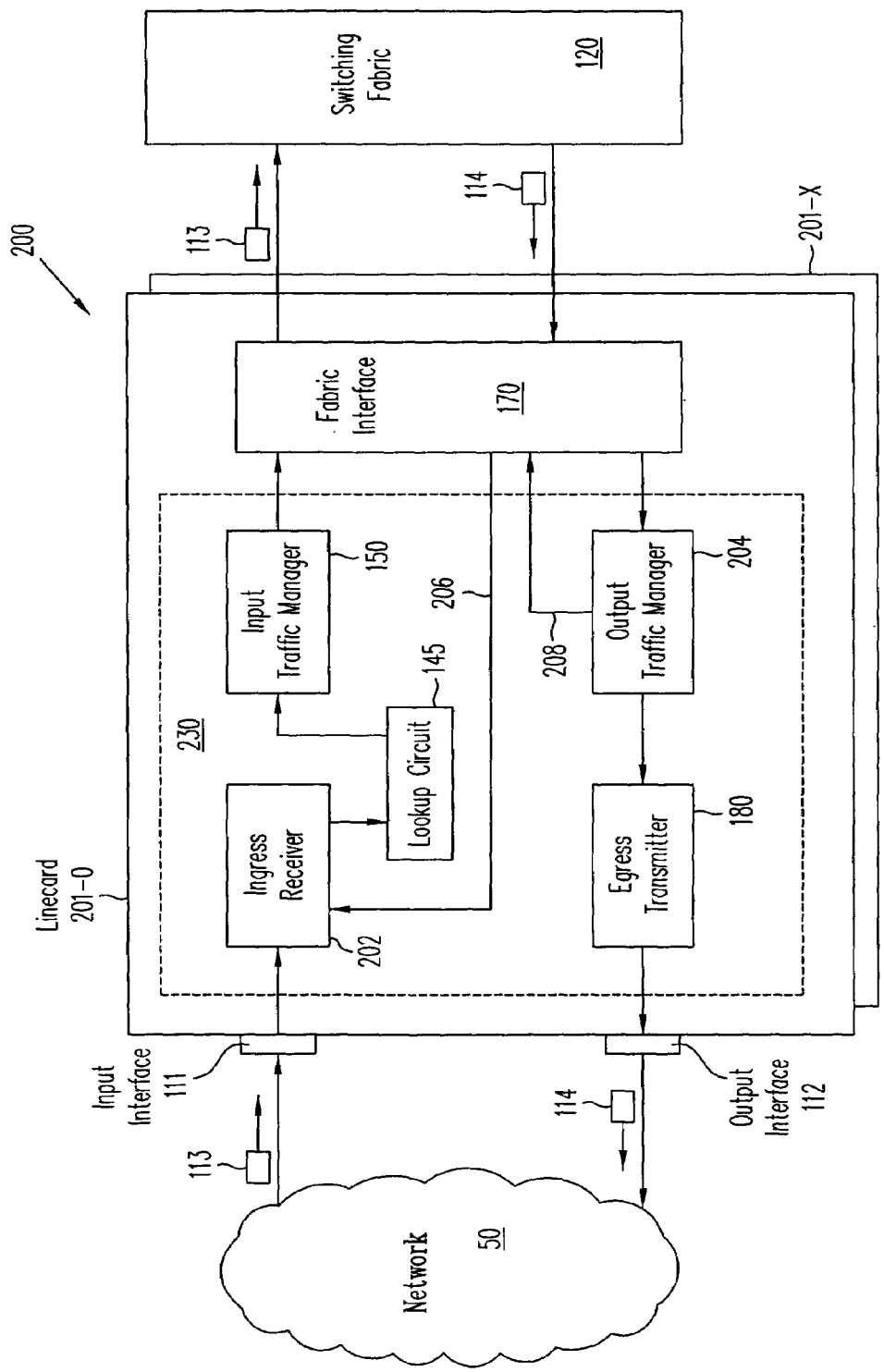
FIG. 2 depicts a packet routing/switching system in accordance with an embodiment of the present invention.

FIG. 2 depicts a block diagram of a packet routing/switching system 200 that may be similar to the packet routing/switching system 100 described earlier except ingress receiver 202 and output traffic manager 204 replace respective ingress receiver 140 and output traffic manager 160, and control element 230 includes paths 206 and 208. Hereafter, control element 230 refers to the control element 230 of each of linecards 201-0 to 201-X, unless otherwise specified.

Ingress receiver 202 is similar to ingress receiver 140 except ingress receiver 202 selectively drops inbound packets 113 destined for an already-full output queue identified by any output traffic manager 204 connected to the switching fabric 120. Description of the operation of ingress receiver 202, in accordance with an embodiment of the present invention, is provided later. In this embodiment, ingress receiver 202 is implemented as hardwired logic, although it may be implemented by computer readable code.

Figure 3:
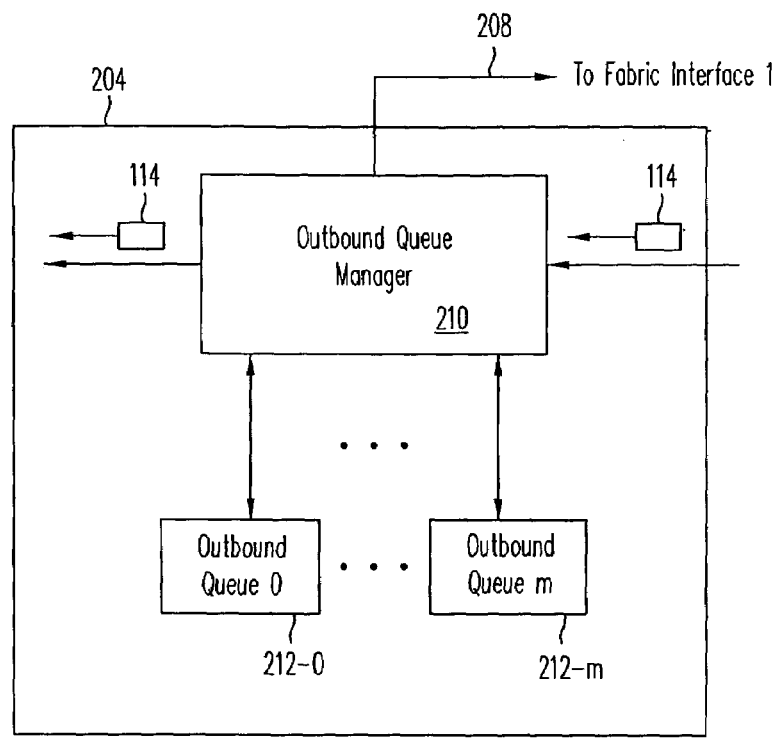
FIG. 3 depicts an output traffic manager used in an embodiment of the present invention.

FIG. 3 depicts in a block diagram form an embodiment of the output traffic manager 204 that includes an outbound queue manager 210 coupled to receive outbound packets 114 from switching fabric 120. The output traffic manager 204 further includes multiple queues 212-0 to 212-*m*. In one embodiment, each of queues 212-0 to 212-*m* is associated with a distinct designation, such as a class of service, quality of service, and/or a virtual private network. The outbound queue manager 210 transfers outbound packets 114 into an appropriate outbound queue. The outbound queue manager 210 further controls transmission of stored outbound packets 114 to egress transmitter 180 (FIG. 2) from any of queues 212-0 to 212-*m* based on the class of service, etc. In one embodiment, output traffic manager 204 is implemented as hardwired logic, although output traffic manager 204 can be implemented by computer readable code.

In accordance with one embodiment of the present invention, the outbound queue manager 210 of each of linecards 201-0 to 201-X detects which of queues 212-0 to 212-*m* is about to overflow or overflowing, i.e., dropping instead of storing inbound packets. Hereafter, outbound queue manager 210 refers to the outbound queue manager 210 of each of linecards 201-0 to 201-X, unless otherwise specified.

Next, each outbound queue manager 210 that detects a queue overflow broadcasts to every ingress receiver 202, i.e., the ingress receiver 202 of each of linecards 201-0 to 201-X, a "drop command," commanding each ingress receiver 202 to drop inbound packets 113 destined for the already-full output queue. In one embodiment, the "drop command" includes the following fields: 1) drop command identifier; and 2) designation or designations of inbound packets 113 that specify the already-full output queue. Such a designation(s) may include the output port as well as the class of service, quality of service, etc. A third optional field is a specified time for each ingress receiver 202 to enforce the drop command. Thereby each ingress receiver 202 monitors for and drops any inbound packets 113 specified in the drop command.

Each ingress receiver 202 subsequently determines when to discontinue enforcement of such drop command. In one embodiment, each ingress receiver 202 discontinues execution of such drop command after a predetermined time period or time period specified in the drop command.

In one embodiment, each ingress receiver 202 discontinues enforcement of such drop command after receiving a complementary "cease drop" command from a outbound queue manager 210. In this embodiment, the outbound queue manager 210 issues a complementary "cease drop" command when it detects that the associated queue is not full or is not dropping packets for a specified interval of time. Determining the fullness of a queue may be determined by incrementing a counter with incoming packets and decrementing the counter with outgoing packets and detecting when the counter hits a threshold. Such techniques and others are well known.

In one embodiment, the "cease drop" command includes the following fields: 1) cease drop command identifier; and 2) an identifier of which packets to no longer drop.

In one embodiment, the outbound queue manager 210 uses the switching fabric 120 to communicate to every ingress receiver 202 the "drop command" or "cease drop." In this embodiment, each outbound queue manager 210 provides the "drop command" and "cease drop" (if used) using path 208, which is coupled to provide signals to the switching fabric 120 through fabric interface 170. In turn, each fabric interface 170 uses path 206 to provide the "drop command" and "cease drop" (if used) to an associated ingress receiver 202.

Figure 4:
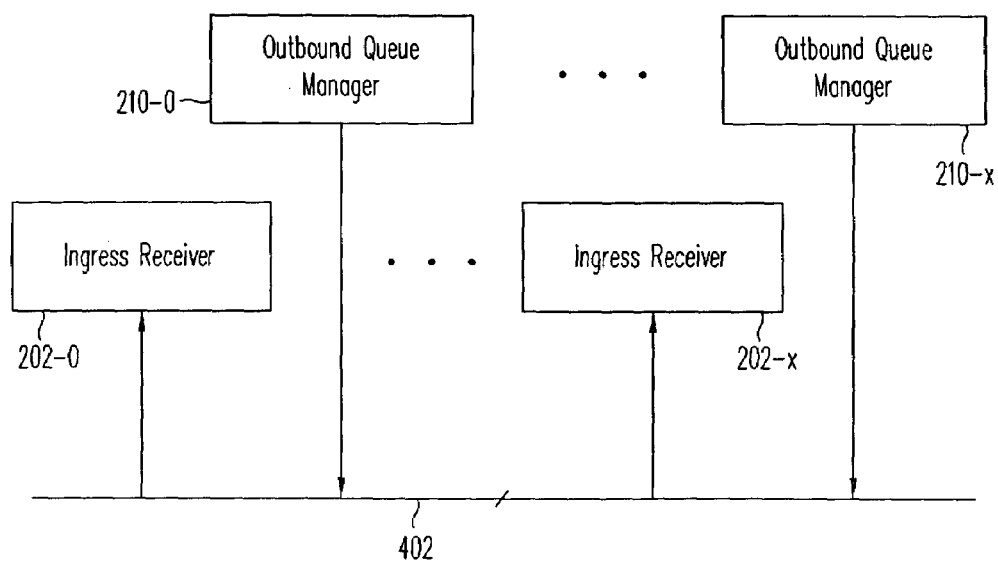
FIG. 4 depicts a combination of an ingress receiver, output traffic manager, and communications bus in accordance with an embodiment of the present invention.

In one embodiment, control element 230 does not use paths 206 and 208 that are coupled to the fabric interface 170. Instead, communications are provided using a dedicated communications bus. FIG. 4 is a block diagram of one embodiment of the present invention in which each of outbound queue managers 210-0 to 210-X of respective line cards 201-0 to 201-X communicates a "drop" or "cease drop" command to any of ingress receiver 202-0 to 202-X of respective line cards 201-0 to 201-X using a conventional communications bus 402 compliant, for example, with the Ethernet communications standard. In this embodiment, every outbound queue manager 210 and every ingress receiver 202 uses a dedicated communications link to the communications bus 402.

Figure 5:
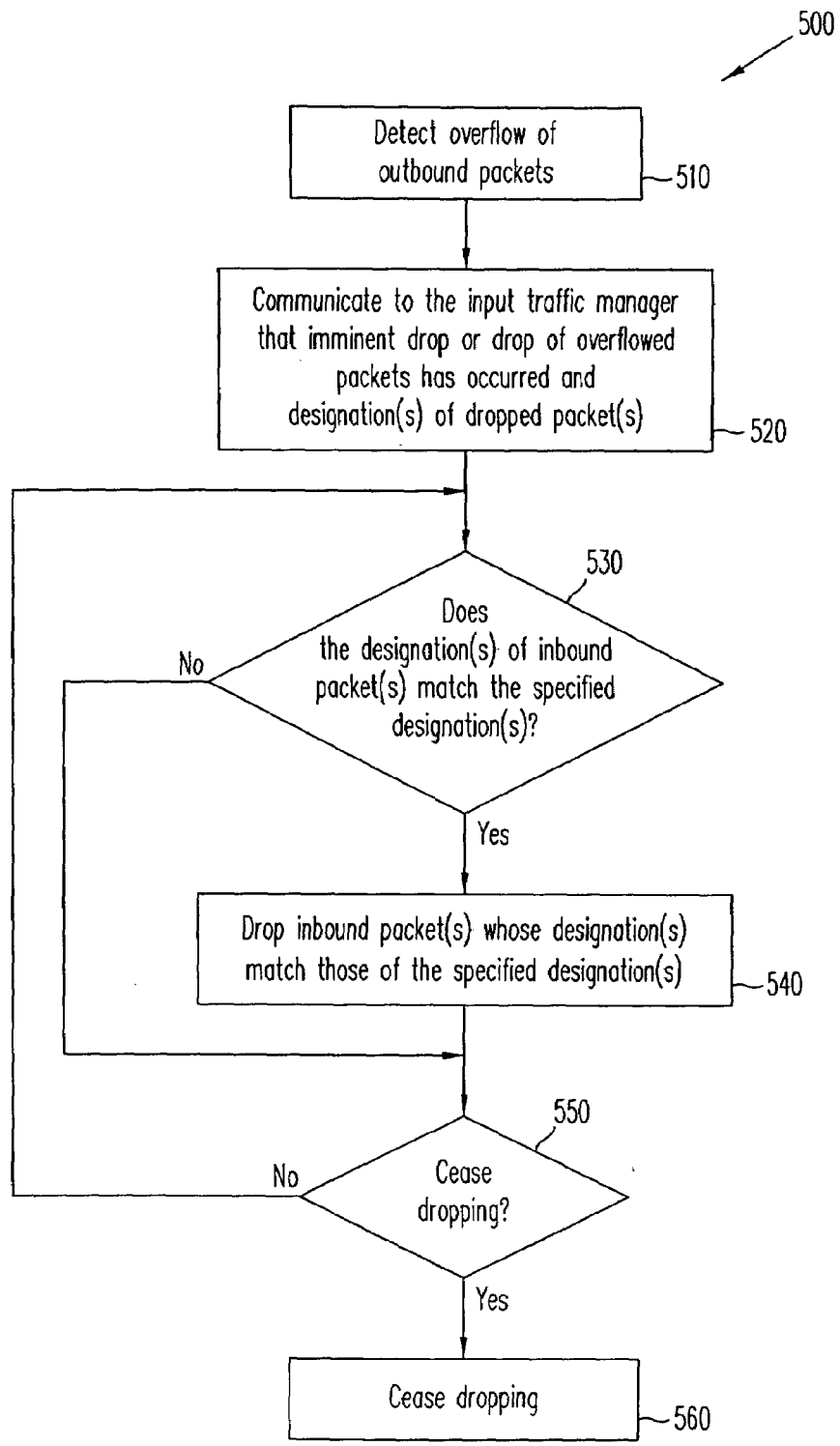
FIG. 5 depicts a suitable process in accordance with an embodiment of the present invention.

The process performed by each control element 230 in accordance with an embodiment of the present invention is provided in FIG. 5 as process 500.

In action 510, an outbound queue manager 210 of output traffic manager 204 detects overflow of at least one of queues 212-0 to 212-m. As stated earlier, each of queues 212-0 to 212-m is associated with a specific designation of outbound packet 114.

In action 520, outbound queue manager 210 identifies the packet designation or designations associated with an overflowed queue among queues 212-0 to 212-m. The outbound queue manager 210 broadcasts to the ingress receiver 202 of every line card 201 a "drop command," i.e., a command to drop inbound packets 114 destined for the overflowed queue.

In action 530, all ingress receivers 202 detect for inbound packets 113 specified by the "drop command" in action 520. If such inbound packets 113 are detected, then, in action 540, the ingress receiver 202 drops those inbound packets 113. Otherwise, action 550 follows.

In action 550, all ingress receivers 202 that execute the drop command of action 520 determine whether to discontinue execution of such drop command. In one embodiment, all ingress receivers 202 discontinue execution of such drop command (action 560) after a predetermined or specified time period. In one embodiment, all ingress receivers 202 discontinue execution of such drop command after receiving a complementary "cease drop" command from a outbound queue manager 210 (action 560).

Mode-Based Operation

Other queuing "modes" can be used as alternatives to the embodiment described earlier with respect to FIG. 5. Thereby, control element 230 of each line card 201 flexibly accommodates varying traffic patterns through the switching fabric 120 and to and from the network 50 by using different queuing modes. For example, conventional output buffering, described earlier, can be used as an alternate mode. Another alternative mode is packet buffering in switching fabric 120. Exemplary embodiments of switching fabric 120 that support packet buffering are available from MMC Networks, I-Cube, and Vitesse Semiconductor.

In one embodiment, to support change of modes, each control element 230 includes a controller device that switches between the modes. The controller may disable the ingress receiver drop capability or prevent transmitting the drop command if a conventional mode is desired.

Modifications

The above-described embodiments of the present invention are merely meant to be illustrative and not limiting. It will thus be obvious to those skilled in the art that various changes and modifications may be made without departing from this invention in its broader aspects. Therefore, the appended claims encompass all such changes and modifications as fall within the true scope of this invention.

What is claimed is:

1. An apparatus for switching packets from a network, the apparatus comprising:
    an ingress receiver that receives inbound packets from the network, said inbound packets being destined for an associated output queue;
    a switch fabric coupled to receive said inbound packets from the ingress receiver; and
    an output traffic manager coupled to receive outbound packets from the switch fabric, wherein
        the output traffic manager includes at least one queue,
        the output traffic manager selectively stores outbound packets into a selected queue and selectively drops outbound packets when the selected queue is at a certain fullness level, and
        approximately when the output traffic manager drops outbound packets or is about to drop said outbound packets, the output traffic manager communicates to the ingress receiver to drop inbound packets destined for the selected queue.

2. The apparatus of claim 1, wherein the output traffic manager identifies at least a designation of imminently droppable or dropped outbound packets, and wherein the ingress receiver drops inbound packets based on the designation.

3. The apparatus of claim 2, wherein said designation comprises a port address to the network.

4. The apparatus of claim 2, wherein the designation comprises a class of service.

5. The apparatus of claim 2, wherein the designation comprises a virtual private network.

6. The apparatus of claim 1, wherein the output traffic manager issues a cease drop command to the ingress receiver to discontinue inbound packet drop.

7. The apparatus of claim 1, wherein the ingress receiver discontinues inbound packet drop after a predetermined time.

8. The apparatus of claim 1, wherein the output traffic manager uses the switch fabric to communicate to the ingress receiver to drop inbound packets.

9. The apparatus of claim 1, wherein the output traffic manager uses a dedicated communications bus to communicate to the ingress receiver to drop inbound packets.

10. The apparatus of claim 1, further comprising a plurality of ingress receivers coupled to receive packets from the network and coupled to the switch fabric, wherein the output traffic manager communicates to the plurality of ingress receivers to drop inbound packets.

11. The apparatus of claim 10, wherein the output traffic manager identifies a designation of imminently droppable or dropped outbound packets and wherein the plurality of ingress receivers drop inbound packets having the designation.

12. The apparatus of claim 11, wherein the output traffic manager issues a cease drop command to the plurality of ingress receivers to discontinue inbound packet drop.

13. The apparatus of claim 12, wherein the output traffic manager uses the switch fabric to communicate to the plurality of ingress receivers to drop inbound packets and cease dropping inbound packets.

14. The apparatus of claim 12, wherein the output traffic manager uses a dedicated communications bus to communicate to the plurality of ingress receivers to drop inbound packets and cease dropping inbound packets.

15. A method of reducing packet traffic through a switching fabric, the method comprising:
  receiving inbound packets from a network;
  transmitting each of said inbound packets to the switching fabric;
  selectively queuing outbound packets from the switching fabric;
  detecting imminent or active dropping of outbound packets due to a queue being full;
  signaling to drop inbound packets destined for said queue approximately when said outbound packets are dropped or about to be dropped; and
  dropping inbound packets destined for said queue.

16. The method of claim 15, wherein said signaling further comprises communicating a designation of the dropped outbound packets.

17. The method of claim 16, wherein dropping further comprises dropping inbound packets that are the same designation as the dropped outbound packets.

18. The method of claim 16, wherein the designation comprises a port address to the network.

19. The method of claim 16, wherein the designation comprises a class of service.

20. The method of claim 16, wherein the designation comprises a virtual private network.

21. The method of claim 15, further comprising issuing a cease drop command to discontinue inbound packet drop.

22. The method of claim 15, further comprising discontinuing inbound packet dropping after a predetermined time.

23. A set of computer executable instructions in a computer readable medium, said instructions for controlling a device to carry out the following steps:
  receiving inbound packets from a network;
  transmitting each of said inbound packets to a switching fabric;
  selectively queuing outbound packets from the switching fabric;
  detecting imminent or active dropping of outbound packets due to a queue being full;
  signaling to drop inbound packets destined for said queue approximately when said outbound packets are dropped or about to be dropped; and dropping inbound packets destined for said queue.

24. The set of computer instructions of claim 23, wherein said signaling further comprises communicating a designation of the dropped outbound packets.

25. The set of computer instructions of claim 24, wherein said dropping further comprises dropping inbound packets that are the same designation as the dropped outbound packets.

26. The set of computer instructions of claim 24, wherein the designation comprises a port address to the network.

27. The set of computer instructions of claim 24, wherein the designation comprises a class of service.

28. The set of computer instructions of claim 24, wherein the designation comprises a virtual private network.

29. The set of computer instructions of claim 23, said instructions for further controlling the device to carry out the following:
  issuing a cease drop command to discontinue inbound packet drop.

30. The set of computer instructions of claim 23, said instructions for further controlling the device to carry out the following:
  discontinuing inbound packet dropping after a predetermined time.

31. A system comprising:
  means for receiving inbound packets from a network;
  means for transmitting each of the inbound packets to a switching fabric;
  means for selectively queuing outbound packets received from the switching fabric;
  means for detecting imminent or active dropping of one or more outbound packets due to a queue being full;
  means for signaling to drop one or more of the inbound packets destined for the queue approximately when said outbound packets are dropped or about to be dropped; and
  means for dropping inbound packets destined for said queue.

32. The system of claim 31, wherein the means for signaling comprise means for communicating a designation of the one or more outbound packets.

33. The system of claim 32, wherein means for dropping comprise means for dropping inbound packets that are the same designation as the one or more outbound packets.

34. The system of claim 32, wherein the designation comprises a port address to the network.

35. The system of claim 32, wherein the designation comprises a class of service.

36. The system of claim 32, wherein the designation comprises a virtual private network.

37. The system of claim 31, further comprising:
  means for issuing a cease drop command to discontinue inbound packet drop.

38. The system of claim 31, further comprising:
  means for discontinuing inbound packet dropping after a predetermined time.

* * * * *